United States Patent [19]

Isogai et al.

[11] Patent Number: 4,477,284

[45] Date of Patent: Oct. 16, 1984

[54] DEMOLITION AGENT FOR DEMOLISHING BRITTLE MATERIALS

[75] Inventors: Jun Isogai, Oumi; Seiichi Nakaya, Itoigawa; Akira Saitou, Oumi; Akio Takahashi, Nou; Isao Yagi, Oumi, all of Japan

[73] Assignee: Denki Kagaku Kogyo Kabushiki Kaisha, Tokyo, Japan

[21] Appl. No.: 447,573

[22] Filed: Dec. 7, 1982

[30] Foreign Application Priority Data

Dec. 12, 1981 [JP] Japan .................... 56-200550

[51] Int. Cl.$^3$ ............... C04B 7/32; C04B 13/06
[52] U.S. Cl. ............... 106/104; 106/90; 106/97; 106/118; 106/119
[58] Field of Search ............... 106/118, 119, 90, 97, 106/104

[56] References Cited

U.S. PATENT DOCUMENTS

| | | | |
|---|---|---|---|
| 3,558,526 | 1/1971 | Hall | 106/118 |
| 4,354,877 | 10/1982 | Kawano et al. | 106/118 |
| 4,409,030 | 10/1983 | Minegishi et al. | 106/118 |

*Primary Examiner*—James Poer
*Attorney, Agent, or Firm*—Jordan and Hamburg

[57] ABSTRACT

According to the present invention, a demolition agent for demolishing brittle materials is provided which comprises 30 to 90 parts by weight of a soft-burned quick lime powder having a crystal size of less than 10 microns and a specific surface area of 1,000 to 5,000 cm$^2$/g (Blaine) and 10 to 70 parts by weight of a hydraulic material, and further including, relative to 100 parts by weight of the mixture of the soft-burned quick lime and the hydraulic material, 0.5 to 15 parts by weight of a hydration retarder and 0.1 to 5 parts by weight of a water-reducing agent.

8 Claims, 2 Drawing Figures

10 μ

10 μ

DEMOLITION AGENT FOR DEMOLISHING BRITTLE MATERIALS

BACKGROUND OF THE INVENTION

1. Field of the Invention

This invention relates to a demolition agent for demolishing brittle materials, such as rock or concrete, and more particularly to a demolition agent for demolishing brittle materials by means of expansive stress, the demolition agent being filled in a hole drilled in the mass of brittle material in the form of a slurry so as to be allowed to expand by hydration.

2. Prior Art

Various demolition methods have hitherto been known for statically demolishing a block of brittle material, such as rock or concrete, wherein the block is drilled to form a hole into which a slurry of expansive material is filled and then allowed to stand for expansion to demolish the block by means of expansive stress.

For example, it has been tried to use quick lime as a demolition agent because it exerts an intensive expansion force upon hydration. However, when the quick lime is used singly, it begins to hydrate and expand immediately after it is mixed with water to lower the fluidity of the mixture rapidly to such degree that the mixture is hardly poured into the hole. This is because the hydration speed of the quick lime is too high. The quick lime slurry has another disadvantage that it tends to spout out of the pouring port due to a so-called gunshot phenomenon, resulting in unsatisfactory exhibition of demolition effect, even though it might be poured into the hole.

In order to obviate the aforementioned disadvantages of the known quick lime slurry, improved powder compositions have been proposed and used by mixing the same with water to form pastes which are poured into holes drilled in rocks or concrete blocks. One of these prior made proposals is disclosed by Japanese Patent Public Disclosure No. 142894/1980, and comprises a mineral powder composition added with a water-reducing agent, said mineral powder composition being prepared by mixing limestone, silica and calcium sulfate in a defined ratio followed by baking to form CaO particles included or surrounded by $3CaO.SiO_2$ crystal grains. Japanese Patent Public Disclosure No. 67059/1981 discloses another improved composition which comprises a hard-burned quick lime powder having a crystal size of not less than 10 microns, for example 20 to 30 microns, and added with a hydraulic material and a modifying agent. However, these compositions are disadvantageous in that an excessively long time is required for them to exhibit their demolishing effect, particularly when the environmental temperature is low to decelerate the reaction speed of quick lime and to depress the expansive pressure. For instance, a time period of more than 14 hours, generally 2 to 3 days, is required for demolition at a temperature of lower than 10° C. and a time period of more than 3 days, generally more than one week, is required when the environmental temperature approximates to 0° C. Another disadvantage involved in the latter-mentioned composition is that the hard-burned quick lime contained therein must be burned at a high temperature ranging from 1300° to 1600° C. for 2 to 7 days. Such a severe burning condition required for the preparation of the composition raises significant operational and economical problems.

OBJECTS AND SUMMARY OF THE INVENTION

A principal object of this invention is to provide a demolition agent for demolishing a brittle material and being capable of exhibiting a high expansive pressure even at a low temperature environment, particularly at a temperature of lower than 10° C., to demolish the block in a short time.

Another object of this invention is to provide a low-cost demolition agent for demolishing a block of brittle material, in which an inexpensive soft-burned quick lime prepared by burning quick lime at a relatively low temperature for a short period of time is used.

A further object of this invention is to provide a demolition agent for demolishing a block of brittle material, which exhibits a high expansive pressure within a short time and yet has no tendency of spouting out of the pouring port.

A still further object of this invention is to provide a demolition agent for demolishing a block of brittle material, which is capable of developing its expansive pressure for a prolonged period of time continuously to advance cracking progressively and to apply intensive demolishing force on the walls of the channels of cracking.

The above and other objects and features of the present invention will be clarified by referring to the following description.

The demolition agent for demolishing brittle materials according to this invention comprises 30 to 90 parts by weight of a soft-burned quick lime powder having a crystal size of less than 10 microns and a specific surface area of 1,000 to 5,000 $cm^2/g$ (Blaine) and 10 to 70 parts by weight of a hydraulic material, and further including, relative to 100 parts by weight of the mixture of the soft-burned quick lime and the hydraulic material, 0.5 to 15 parts by weight of a hydration retarder and 0.1 to 5 parts by weight of a water-reducing agent.

DESCRIPTION OF THE INVENTION

Figure 1:
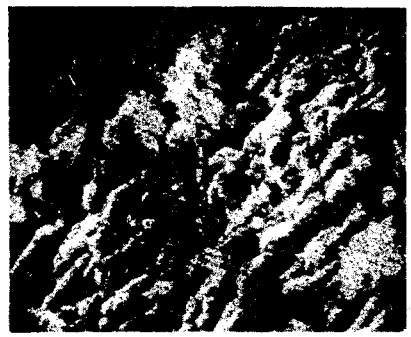
FIG. 1 is a microphotograph taken through an electron microscope and showing the crystal size of the soft-burned quick lime contained in the demolition agent according to this invention.

The present invention will now be described more specifically hereinbelow.

The demolition agent according to this invention comprises a soft-burned quick lime, a hydraulic material, a hydration retarder and a water-reducing agent, and contains a mixture composed of 30 to 90 parts by weight, preferably 50 to 70 parts by weight, of a soft-burned quick lime having a crystal size of less than 10 microns and 10 to 70 parts by weight, preferably 30 to 50 parts by weight, of a hydraulic material, as the main component.

The soft-burned quick lime contained in the demolition agent according to this invention has a crystal size of less than 10 microns, preferably from 2 to 7 microns, more preferably ranging within 2 to 7 microns with the major portion of the crystals having the size of about 5 microns; and the specific surface area thereof ranges between 1,000 to 5,000 cm$^2$/g (Blaine), and preferably 2,000 to 4,000 cm$^2$/g (Blaine). The soft-burned quick lime may be prepared by burning quick lime under variable burning conditions in a variety of burning furnaces, and preferably by burning quick lime with a fuel gas generally at 1,000° to 1,300° C., preferably at 1,100° to 1,250° C., generally for 1 to 5 hours, preferably for 2 to 4 hours.

An aqueous slurry of the soft-burned quick lime pulverized to have the specific surface area of from 1,000 to 5,000 cm$^2$/g (Blaine) does not provide a satisfactory demolition agent when used singly, because such a slurry tends to spout out of the pouring port due to a so-called gunshot phenomenon caused by premature hydration reaction to fail to develop effective expansive pressure even when it is poured into a hole drilled in a rock or concrete block. According to the present invention, the gunshot phenomenon can be suppressed by the use of a composition composed of 30 to 90 parts by weight of the soft-burned quick lime powder having a crystal size of less than 10 microns and 10 to 70 parts by weight of an added hydraulic material.

The composition of the main component is restricted in the aforementioned range according to this invention for the following reasons. If the content of the soft-burned quick lime is less than 30 parts by weight, the expansive pressure developed by the composition becomes too low to demolish a block within a sufficiently short time. On the contrary, if the content of the soft-burned quick lime exceeds 90 parts by weight, the hydration reaction speed of the slurry becomes so high that the slurry poured into a hole drilled in a rock or concrete block spouts out of the pouring port due to gunshot phenomenon and it becomes impossible to utilize the expansive pressure as the effective demolition power.

The soft-burned quick lime having a specific surface area of less than 1,000 cm$^2$/g (Blaine) tends to cause disadvantageous bleeding problems. An excessively finer soft-burned quick lime having a specific surface area of more than 5,000 cm$^2$/g raises another disadvantage that the reactivity thereof becomes exceedingly higher to result in poor fluidity of the resultant slurry.

Examples of the hydraulic materials which may be mixed with the main component of the demolition agent according to this invention include a variety of Portland cements, such as normal Portland cement, high early strength Portland cement, ultra high early strength Portland cement, moderate heat Portland cement and white Portland cement; a variety of mixed cements such as blast furnace slag cement, fly ash cement and mixed cement containing pozzolana; and rapid hardening hydraulic materials such as rapid hardening cement, alumina cement, calcium aluminate including amorphous calcium aluminate prepared by mixing lime with bauxite and then melting at 1,300° to 1,600° C. followed by cooling, for example having a composition of $C_{12}A_7$, $C_3A$, $CA$ or $C_{11}A_7 \cdot CaF_2$ and a mixture of the calcium aluminate and/or amorphous calcium aluminate with calcium sulfate such as the Type II anhydrous calcium sulfate. The preferred hydraulic materials are rapid hardening hydraulic materials, and particularly preferred is a mixture of amorphous calcium aluminate, most preferably having a composition of $C_{12}A_7$ and Type II anhydrous calcium sulfate. The content of the rapid hardening hydraulic material is restricted within the range as defined in the appended claims according to the present invention, because the gunshot phenomenon cannot be suppressed if the content thereof is less than 10 parts by weight, whereas the expansive pressure becomes significantly lowered to prolong the time period required for demolition if the content thereof exceeds 70 parts by weight.

According to a further aspect of this invention, a hydration retarder is added to the main component comprising 30 to 90 parts by weight of a soft-burned quick lime powder having a crystal size of less than 10 microns and having a specific surface area of from 1,000 to 5,000 cm$^2$/g (Blaine) and 10 to 70 parts by weight of a hydraulic material, in order to ensure the fluidity of the slurry during the operation of pouring the slurry into a hole. The thus added hydration retarder acts to retard hydration reaction at the initial stage to provide sufficient operation time for pouring the slurry into a hole, and also serves to prevent premature expansion at the early stage to increase the expansive pressure developed by the slurry after a pertinent time lag. The hydration retarders preferably used in the demolition agent according to this invention include inorganic salts such as potassium carbonate, sodium carbonate, sodium bicarbonate, potassium bicarbonate, sodium silicofluoride and caustic soda, organic acids such as citric acid, tartaric acid and gluconic acid, salts of said organic acids such as sodium and potassium salts and mixtures thereof. 0.5 to 15 parts by weight of the hydration retarder is added to 100 parts by weight of the main component. The hydration retarder is used in the present invention to retard the hydration reaction of the main component, as described before. Since the hydration reaction is affected considerably by the changes in environmental temperature, the amount of the added hydration retarder should be varied depending on the temperature of the environment in order to control the lifetime of the slurry within a desired operation time, which ranges generally from 15 to 30 minutes. The optimum amount of the hydration retarder is in the range of from 0.5 to 5 parts by weight, relative to 100 parts by weight of the main component, at a temperature of from 0° to 10° C.; in the range of from 5 to 10 parts by weight at a temperature of from 10° to 30° C.; and in the range of from 10 to 15 parts by weight at a temperature of from 30° to 40° C. Although the optimum amount of the hydration retarder added to the main component varies at some extent depending on the quality and the specific surface area of the soft-burned quick lime, the life-time or pot-life of the resultant slurry becomes too short if the added amount is less than 0.5 parts by weight and becomes too long if the added amount is more than 15 parts by weight.

According to a still further aspect of this invention, 0.1 to 5 parts by weight, relative to 100 parts by weight of the main component, of a water-reducing agent is added to provide the demolition agent. Examples of the water-reducing agents preferably used in this invention include lignin sulphonates, polyalkylaryl sulphonates, sulphonates of melamine-formaldehyde resins, sulphonates of aromatic polycyclic condensates, modified products of the aforementioned materials such as a modified lignin sulphonate deprived of oligomers including saccharide. Mixtures of the aforementioned water-reducing agents may also be used. By the addition of a water-reducing agent, the fluidity of the resultant slurry may be improved and the expansive pressure may be increased to exert more intensive demolition force because the quantity of water mixed to form the slurry may be decreased. 0.1 to 5 parts by weight of the water-reducing agent is added to 100 parts by weight of the main component. The advantageous effect of the water-reducing agent is hardly appreciable if the content thereof is less than 0.1 parts by weight, whereas the water-reducing effect provided thereby cannot be enhanced any more even if the content thereof exceeds 5 parts by weight.

As will be understood from the foregoing, the improved demolition agent for demolishing a brittle material, such as a rock or concrete block, provided by the present invention comprises 100 parts by weight of a main component including 30 to 90 parts by weight of a soft-burned quick lime powder having a crystal size of less than 10 microns and having a specific surface area of 1,000 to 5,000 cm$^2$/g (Blaine) and 10 to 70 parts by weight of a hydraulic material, 0.5 to 15 parts by weight of a hydration retarder and 0.1 to 5 parts by weight of a water-reducing agent. The demolition agent according to this invention gives a slurry having proper fluidity and develops intensive expansive pressure. When the demolition agent is mixed with water at a water/demolition agent ratio of 25 to 40 wt %, preferably 30 to 35 wt %, to form a slurry and then the slurry is poured into a hole drilled in a rock or concrete block, the rock or concrete block may be demolished within a short period of time even in a low temperature environment.

EXAMPLES OF THE INVENTION

The present invention will now be described more specifically by referring to presently preferred examples thereof.

In the following examples, "part" and "%" stand for "part by weight" and "% by weight" unless otherwise specified.

EXAMPLE 1

Limestone was burned with a fuel gas in a furnace at 1150° C. for 3 hours to obtain powdery soft-burned quick lime having a crystal size of 2 to 7 microns, the major portion of the crystal grains having a size of about 5 microns. FIG. 1 shows the microphotograph of the resultant soft-burned quick lime taken at a magnification of 1400 using the Model MSH-2 scanning-type electron microscope produced by Hitachi-Akashi Seisakusho. The soft-burned quick lime was then pulverized to prepare a powder having a specific surface area of 3,000 cm$^2$/g (Blaine). 60 parts of the pulverized powder was mixed with 40 parts of a rapid hardening hydraulic material, the rapid hardening material being a mixture of 50% of amorphous calcium aluminate having a composition represented by 12CaO.7Al$_2$O$_3$ and 50% of the Type II anhydrous calcium sulfate, the mixture being pulverized to have the specific surface area of 4,000 cm$^2$/g, whereby 100 parts of a main component was prepared. 5 parts of a hydration retarder consisting of 70% of potassium carbonate, 15% of sodium gluconate and 15% of citric acid and 2 parts of a water-reducing agent made of a lignin sulphonate, "ULTRAZINE NA" sold from Borregaard Co., were added to 100 parts of the aforementioned main component to obtain a demolition agent, to which was added water in a ratio of 30% (water/agent ratio) to form a slurry. After mixing the slurry, the slurry was poured into the holes respectively drilled in a plain concrete block and a reinforced concrete block, each having a compressive strength of 350 kg/cm$^2$. The time periods required for demolishing respective concrete blocks were determined and shown in the following Table 1.

COMPARATIVE EXAMPLE 1

A comparative test was conducted similarly to Example 1, except in that a commerially available demolition agent composed of a hard-burned quick lime and sold under the Trade Name "BRAISTAR" from Onoda Cement Co., Ltd. was used in place of the demolition agent as used in Example 1. The results are shown in Table 1.

TABLE 1

| Sample to be Demolished | Dimensions of Concrete Block (cm) | Temp. (°C.) | Dimensions of Hole (cm) | Demolition Agent Used | Time Required* for Demolition (hr.) | Time Required for Cracking Channel to have widths of 3 mm (hr.) |
|---|---|---|---|---|---|---|
| Plain Concrete | 60 × 60 × 60 | 5 | φ3.8 × 57 | Present Invention | 8 | 12 |
|  |  |  |  | Commercial Product | 40 | 48 |
| Reinforced Concrete | 50 × 50 × 50 | 5 | φ3.8 × 47 | Present Invention | 10 | 14 |
|  |  |  |  | Commercial Product | 60 | 68 |

Note:
*The time required for demolition was determined to learn the time period terminated when the cracking channels growing from the center of the drilled hole in the radial direction reach the overall peripheral surface portions of the sample block.

EXAMPLE 2

A hole having a diameter of 38 mm and a depth of 700 mm was drilled in each of limestone and granite blocks of about 1 meter cubic cleaved out of a raw ore at a mining site using an explosive powder, and filled with the demolition agent slurry of this invention as described in Example 1. The blocks were allowed to stand in the atmosphere of 5° to 10° C. to reveal that both blocks were demolished within 12 hours.

COMPARATIVE EXAMPLE 2

Comparative tests were conducted similarly to Example 2, except in that the commercially available demolition agent as used in Comparative Example 1 was used in place of the demolition agent according to the present invention. As a result, more than 20 hours were required to demolish the blocks.

EXAMPLE 3 AND COMPARATIVE EXAMPLES 3 TO 5

The expansive pressures of the demolition agent used in Example 1, developed respectively at 0° C., 5° C. and 20° C., were measured. For the comparison purpose, the expansive pressures of the following comparative examples at respective temperatures were measured.

Comparative Example 3: The crystal size of the burned quick lime was changed to 20 to 30 microns by burning at 1400° C. for 2 days, the other conditions being the same as in Example 1.

Comparative Example 4: A demolition agent was prepared similarly to Example 1, except in that the hydration retarder was excluded.

Comparative Example 5: A demolition agent was prepared in accordance with the procedure set forth in Example 1 of Japanese Patent Public Disclosure No. 67059/1981, the demolition agent being available from Onoda Cement Co., Ltd. and composed of 85 parts of a hard-burned quick lime having a crystal size of 20 to 30 microns and a specific surface area of 3,300 cm$^2$/g (Blaine) and obtained by burning limestone at 1400° C. for 2 days 15 parts of normal Portland cement and 1 part of a naphthalene sulphonic acid-formalin condensate available from Kao Soap Co., Ltd. under the Trade Name of "Mighty".

Figure 2:
FIG. 2 is a microphotograph taken through an electron microscope and showing the crystal size of the hard-burned quick lime contained in the known demolition agent disclosed by Japanese Patent Public Disclosure No. 67059/1981.

The expansive pressures measured in Example 1 and Comparative Examples 3 to 5 are shown in Table 2. Also measured and shown in Table 2 are the time periods required for respective demolition agents to demolish plain concrete blocks in a manner similar to Example 1. In order to clarify the difference between the crystalline size and appearance of the hard-burned quick lime used in Comparative Examples 3 and 5 from those of the soft-burned quick lime used in accordance with the present invention, FIG. 2 shows a microphotograph of the hard-burned quick lime taken in a magnification of 700 using the same electron microscope used to take the microphotograph of FIG. 1.

The expansive pressure was measured in the following manner. A steel plate was welded to cover the bottom of a carbon steel pipe used for general piping purpose and having an inner diameter of 36 mm and a length of 600 mm. A paper strain gauge having a length of 10 mm was applied on the surface of the steel pipe along the peripheral and longitudinal directions at the positions approximately centrally of the length of the pipe. Then, each of the tested slurries was filled in the pipe, and the strain of the pipe was measured after the expansive pressure was developed in the pipe. The expansive pressures were calculated from the measured strain values.

TABLE 2

| Example No. | Temperature (°C.) | Expansive Pressure (kgf/cm$^2$) After 2 hr. | After 12 hr. | After 24 hr. | Time required for Demolition (hr.) |
|---|---|---|---|---|---|
| Example 3 | 0 | 35 | 130 | 210 | 12 |
| | 5 | 60 | 260 | 330 | 8 |
| | 20 | 150 | 420 | 640 | 4 |
| Comp. Ex. 3 | 0 | 4 | 70 | 150 | 16 |
| | 5 | 20 | 180 | 270 | 11 |
| | 20 | 80 | 390 | 520 | 6 |
| Comp. Ex. 4 | 0 | Pourable slurry could not be prepared. | | | — |
| | 5 | | | | — |
| | 20 | | | | — |
| Comp. Ex. 5 | 0 | 0 | 8 | 30 | 70 |
| | 5 | 0 | 60 | 180 | 14 |
| | 20 | 10 | 160 | 300 | 9 |

EXAMPLES 4 AND 5

Demolition agents were prepared similarly to Example 1, except in that different kinds of hydraulic materials were used. Generally in accordance with the procedures as described in Example 3, the expansive pressures and the time periods required for demolishing plain concrete blocks were measured. The results are shown in Table 3.

TABLE 3

| Ex. No. | Hydraulic Material Used | Temp. (°C.) | Expansive Pressure (kgf/cm$^2$) After 2 hr. | After 12 hr. | After 24 hr. | Time Required for Demolition (hr.) |
|---|---|---|---|---|---|---|
| Ex. 4 | Normal Portland Cement | 0 | 0 | 50 | 100 | 36 |
| | | 5 | 7 | 90 | 190 | 16 |
| | | 20 | 55 | 160 | 230 | 12 |
| Ex. 5 | *Rapid Hardening Cement Containing $C_{11}A_7CaF_2$ | 0 | 5 | 90 | 180 | 18 |
| | | 5 | 30 | 200 | 290 | 10 |
| | | 20 | 100 | 360 | 520 | 7 |

Note:
*The rapid hardening cement used in Example 5 is sold from Sumitomo Cement Co., Ltd. under the Trade Name "Sumitomo Jet Cement".

Although the present invention has been described with reference to specific examples thereof, it should be understood that various modifications and variations may be easily made by those skilled in the art without departing from the spirit of the invention. It is, thus, intended to include all such modifications and variations within the wide scope of the invention as defined in the appended claims.

What is claimed is:

1. A demolition agent for demolishing brittle materials comprising 30 to 90 parts by weight of a soft-burned quick lime powder having a crystal size of less than 10 microns and a specific surface area of 1,000 to 5,000 cm$^2$/g (Blaine) and 10 to 79 parts by weight of a rapid hardening hydraulic material comprising amorphous calcium aluminate and calcium sulfate, and further including, relative to 100 parts by weight of the mixture of the soft-burned quick lime and the rapid hardening hydraulic material, 0.5 to 15 parts by weight of a hydration retarder and 0.1 to 5 parts by weight of a water-reducing agent.

2. A demolition agent according to claim 1, wherein the crystal size of said soft-burned quick lime powder ranges from 2 to 7 microns.

3. A demolition agent according to claim 2, wherein the major portion of said soft-burned quick lime powder has a crystal size of about 5 microns.

4. A demolition agent according to claim 1, wherein said soft-burned quick lime is prepared by calcining limestone at 1000° to 1300° C. for 1 to 5 hours with a fuel gas.

5. A demolition agent according to claim 1, wherein said rapid hardening hydraulic material is a mixture of amorphous calcium aluminate with Type II anhydrous calcium sulfate.

6. A demolition agent according to claim 1, wherein said hydration retarder is selected from the group consisting of inorganic salts, organic acids, salts of organic acids and mixtures thereof.

7. A demolition agent according to claim 6, wherein said inorganic salt is selected from the group consisting of potassium carbonate, sodium carbonate, sodium bicarbonate, potassium bicarbonate, sodium silicofluoride and caustic soda, and wherein said organic acid is selected from the group consisting of citric acid, tartaric acid and gluconic acid.

8. A demolition agent according to claim 1, wherein said water-reducing agent is selected from the group consisting of lignin sulphonates, polyalkylaryl sulphonates, sulphonates of melamine-formaldehyde resins, sulphonates of aromatic polycyclic condensates, modified products of the aforementioned materials and mixtures thereof.

* * * * *